United States Patent [19]
Freitas

[11] Patent Number: 5,793,556
[45] Date of Patent: Aug. 11, 1998

US005793556A

[54] HIGH SPEED PES DEMODULATOR

[75] Inventor: David Anthony Freitas, Morgan Hill, Calif.

[73] Assignee: International Business Machines Corporation, Armonk, N.Y.

[21] Appl. No.: 325,832

[22] Filed: Oct. 19, 1994

[51] Int. Cl.$^6$ .................................................. G11B 5/596
[52] U.S. Cl. ........................................ 360/77.08; 360/75
[58] Field of Search .............................. 360/75, 49, 51, 360/77.08

[56] References Cited

U.S. PATENT DOCUMENTS

| | | |
|---|---|---|
| 4,594,622 | 6/1986 | Wallis . |
| 4,616,276 | 10/1986 | Workman . |
| 4,642,562 | 2/1987 | Collins et al. . |
| 4,719,447 | 1/1988 | Garuts ........................... 340/347 AD |
| 4,724,370 | 2/1988 | Moraru et al. . |
| 4,791,406 | 12/1988 | Mehrgardt et al. . |
| 4,803,676 | 2/1989 | Baas . |
| 4,939,518 | 7/1990 | Hotta et al. . |
| 5,034,746 | 7/1991 | Herbst et al. . |
| 5,384,671 | 1/1995 | Fisher ................................. 360/49 X |
| 5,406,285 | 4/1995 | Diffenderfer et al. . |
| 5,416,484 | 5/1995 | Lofstrom . |
| 5,426,539 | 6/1995 | Llewellyn et al. . |
| 5,442,498 | 8/1995 | Cheung et al. ..................... 360/77.08 |

FOREIGN PATENT DOCUMENTS

| | | |
|---|---|---|
| 61-32272 | 2/1986 | Japan . |
| 3-178084 | 8/1991 | Japan . |

OTHER PUBLICATIONS

W. A. Herrington and F. E. Mueller, "Quad–Burst PES System for Disk File Servo," IBM Technical Disclosure Bulletin, vol. 21, No. 2, Jul. 1978, pp. 804–805.

C. C. Liu, "Quad–Burst Servo Pattern," IBM Technical Disclosure Bulletin, vol. 22, No. 12, May 1980, pp. 5436–5438.

D. W. Siljenberg and J. T. Trnka, "High Speed Differential Peak Detector," IBM Technical Disclosure Bulletin, vol. 27, No. 3, Aug. 1984, pp. 1748–1751.

F. D. Dickin and J. W. Jones, "Digital Algorithmic Unit for Servo Control," IBM Technical Disclosure Bulletin, vol. 27, No. 6, Nov. 1984, pp. 3231–3236.

F. E. Mueller, "Digital Demodulator for Quad–Burst Position Error Signal," IBM Technical Disclosure Bulletin, vol. 31, No. 9, Feb. 1989, pp. 159–160.

D. Freitas, G. Herbst, and M. Moser, "Asynchronous Quadrature Burst Position Error Demodulation Technique," IBM Technical Disclosure Bulletin, vol. 34, No. 5, Oct. 1991, pp. 406–407.

K. Okada, M. Yamaguchi, and Y. Yokoe, "Hard Disk Actuator Control Under Power Save Mode," IBM Technical Disclosure Bulletin, vol. 35, No. 3, Aug. 1992, pp. 92–93.

*Primary Examiner*—Aristotelis M. Psitos
*Assistant Examiner*—James L. Habermehl
*Attorney, Agent, or Firm*—Gray Cary Ware Freidenrich, LLP

[57] ABSTRACT

A channel circuit that receives an analog disk readback signal of a data storage disk drive includes a comparator string and a data channel binary decoder that together comprise what is commonly referred to as a flash analog-to-digital (A/D) converter, which processes the data channel information of the readback signal. The servo information of the readback signal is provided to the comparator string of the data channel flash A/D converter, whose output then is provided to a servo burst binary decoder for decoding to produce the desired servo burst data. Thus, the servo information is digitized and decoded at the relatively high speed possible with a flash A/D converter, without requiring a comparator string in addition to what would otherwise be provided for the data channel application.

11 Claims, 10 Drawing Sheets

|  | INPUT |  |  |  |  |  | OUTPUT |  |  |  |
|---|---|---|---|---|---|---|---|---|---|---|
| X31 | ... | X4 | X3 | X2 | X1 | X0 | Y4 | Y3 | Y2 | Y1 | Y0 |
| 0 | ... | 0 | 0 | 0 | 0 | 0 | 0 | 0 | 0 | 0 | 0 |
| 0 | ... | 0 | 0 | 0 | 0 | 1 | 0 | 0 | 0 | 0 | 1 |
| 0 | ... | 0 | 0 | 0 | 1 | 1 | 0 | 0 | 0 | 1 | 0 |
| 0 | ... | 0 | 0 | 1 | 1 | 1 | 0 | 0 | 0 | 1 | 1 |
| 0 | ... | 0 | 1 | 1 | 1 | 1 | 0 | 0 | 1 | 0 | 0 |
| ⋮ |  |  | ⋮ |  |  |  |  | ⋮ |  |  |  |
| 1 | ... | 1 | 1 | 1 | 1 | 1 | 1 | 1 | 1 | 1 | 1 |

*FIG. 9*

HIGH SPEED PES DEMODULATOR

BACKGROUND OF THE INVENTION

1. Field of the Invention

This invention relates generally to data storage device servo control systems and, more particularly, to position signal demodulators for control systems that position the transducing heads of storage devices across the surface of a moving storage medium.

2. Description of the Related Art

In conventional computer data storage systems having a rotating storage medium, such as a magnetic or magneto-optical disk, data is stored in a series of concentric or spiral tracks across the surface of the disk. The data comprises a series of variations in disk surface magnetic orientation laterally recorded in the tracks. A magnetic read/write head suspended over the disk surface transduces the variations in magnetic orientation and produces a readback signal. The variations in magnetic orientation, generally comprising reversals of magnetic flux, represent binary digits of ones and zeroes that in turn represent data. The magnetic read/write head detects the variations in magnetic orientation and generates the readback signal as the disk rotates relative to the read/write head at thousands of revolutions per minute.

Reading and recording data in a desired one of the tracks on the disk surface requires knowledge of the read/write head position relative to the track as the disk rotates and requires precise centering of the head over the disk track. Conventionally, the read/write head is mounted on a disk arm that is moved by a servo. A disk drive servo control system controls movement of the arm across the surface of the disk to move the read/write head from track to track and, once over a selected track, to maintain the read/write head in a path centered over the track in a track following operation.

A servo control system maintains the read/write head centered over a track by reading servo information from the disk surface. The servo information comprises a servo pattern of high frequency magnetic flux transitions, generally flux reversals, that are pre-recorded in the tracks. A servo read head, which can be either the same head used for reading the binary data or can be a dedicated servo pattern head, transduces the servo pattern and produces an analog signal. The servo pattern analog signal is demodulated by servo control system demodulation circuitry to provide information on the number of the track from which the servo pattern was read and on the position of the read/write head relative to the track and also to produce a position error signal that is used to control the disk arm servo. In this way, the servo control system detects the track over which the read/write head is positioned and controls movement of the head relative to the track.

There are a variety of methods for providing servo information to a disk servo control system. In a method referred to as the dedicated servo method, the entire surface of one disk is provided with servo information. A servo magnetic head is positioned over the dedicated servo disk surface in a fixed relationship relative to one or more data read/write heads positioned over other data disk surfaces. The position of the servo head is used to indicate the position of the data read/write heads. The dedicated servo method is most often used with multiple disk systems, because a dedicated servo system for a single disk application would use one-half of the available disk surface area for servo information and therefore would not be especially efficient.

Another method of providing servo information is known as the sector servo method. In the sector servo method, each disk surface includes servo information and binary data within a single track. The tracks on a sector servo disk surface are divided into radial sectors having a short servo information field followed by a data field. The servo information field includes a sector marker, which indicates to the read/write head that servo information immediately follows in the track, track identification number, and a high-frequency servo burst pattern. The sector servo method is more efficient than the dedicated servo method for low-profile disk drives with fewer disks in the configuration, because a single read/write head can be used to obtain the servo information and to read and record data from the disk and also because less of the total disk surface area is used for servo information. As users demand greater storage capacities from low profile disk systems, manufacturers provide less and less disk area for servo information by decreasing sector length and track width. To obtain the same amount of servo information in less disk area, the servo information must be recorded at higher and higher frequencies. The higher servo frequencies place a premium upon fast servo demodulation and data transducing.

In both the dedicated servo and sector servo methods, an analog servo burst portion of the readback signal is produced as the servo pattern is read from the disk. The servo signal is used to generate a corrective position error signal (PES) used by a servo controller to cause the head positioning servo to move and control the head position over the disk. The remaining description assumes a sector servo system, but it will be clear without further explanation to those skilled in the art how the description can be applied to dedicated servo systems.

The servo pattern comprises flux transitions that are recorded laterally down the length of the track relative to each track centerline and, when read from the disk and demodulated, provide a PES whose amplitude depends on the location and orientation of flux transitions in the track located beneath the read/write head. The PES provides an indication of the direction and extent of read/write head movement required to maintain the head centered about the track. Servo patterns vary depending on the manufacturer and the system. For example, in one system a first group of transitions comprises a first servo pattern burst and a second group of transitions comprises a second servo pattern burst. The PES is produced, or demodulated, from the servo bursts by determining the magnitude of each burst and then determining the amplitude difference of the first and second burst magnitudes. If the amplitude difference is zero, then the read/write head is positioned exactly over the track centerline. A positive amplitude difference indicates that the head is off center in one direction and a negative amplitude difference indicates that the head is off center in the opposite direction.

Some sector servo demodulation circuits use digital techniques to demodulate both the servo signal and the data channel signal components of the head readback signal. The detection of the readback signal produced when the read/write head is over a data field of the disk track frequently is accomplished with a relatively high-speed digital conversion scheme provided by what is known as a "flash" analog-to-digital (A/D) converter and also as a parallel-comparator A/D converter. Flash A/D converters are relatively complex and costly but provide the performance necessary for high-speed data channel architectures. Such converters include a plurality of parallel-connected comparators that very quickly generate a thermometer code value that must then be decoded by a binary decoder circuit. Such converters are very fast and can provide digitized values in times on the order of nanoseconds. In contrast, the servo signal demodulation is not required to be as fast as the data channel. Therefore less complicated, less costly, and less expensive capacitive A/D conversion circuits frequently are used for demodulation of the readback signal produced when the read/write head is over a servo field of the disk track.

A capacitive A/D converter includes multiple capacitors that are charged up to their rated voltages in response to the readback signal and then are read out to incrementally indicate the total voltage received. The capacitive A/D converter output voltage is conveniently provided to a difference circuit that, for example, subtracts the output provided by a first servo burst from the output provided by a second servo burst to generate the PES for servo control. The time necessary to charge up the multiple capacitors of a capacitive A/D converter is sufficiently small so that the capacitors can be discharged before the servo burst signals from the next servo field are received. Thus, after the capacitors of the converter are charged and their voltages are read, there is sufficient time to complete the servo signal processing, generate the PES, and provide the PES to the servo controller before the next input.

Although the capacitive A/D converter is relatively cost-effective, its slow speed and capacitive charge time results in a significant delay before the servo controller can respond to the servo signal, resulting in position inaccuracies. The time needed for processing the data also can result in relatively high power consumption by the demodulation circuit because processing must continue long after a servo burst signal has been received. In addition, the decreasing width of servo fields in high capacity disk drives further constrains the processing time available for demodulation. Finally, the capacitive A/D converter leaves generally insufficient time for more sophisticated signal processing that could reduce signal noise and provide more accurate servo position data.

From the discussion above, it should be apparent that there is a need for a digital servo signal demodulator that provides faster processing of servo burst data without increased cost and circuit complexity and that accommodates high frequency servo patterns. The present invention fulfills this need.

SUMMARY OF THE INVENTION

In accordance with the invention, a data storage disk drive includes a magnetic read/write head that produces an analog readback signal provided to a comparator string and a servo burst binary decoder of a demodulation circuit that thereby produces a digitized servo signal with sufficient speed that multiple signal samples for each servo burst can be processed before the next burst, thereby reducing the amount of noise in the servo signal. Additional gain processing is easily incorporated with the comparator string and binary decoder of the demodulation circuit by adjusting the range of the comparator string output, which further reduces the amount of servo signal noise. In addition, the time needed for processing the servo signal is sufficiently reduced such that power consumption of the demodulation circuit is significantly reduced during a track following operation. In this way, servo signal processing is improved, less complex and costly circuitry can be used, and power consumption is reduced.

A demodulation circuit sufficient for the relatively high-speed processing of a data channel typically includes a comparator string and a data channel binary decoder that together comprise what is commonly referred to as a flash analog-to-digital (A/D) converter, which processes the data channel information of the readback signal. In one aspect of the invention, the servo information of the readback signal is provided to the comparator string of the data channel flash A/D converter, whose output then is provided to the servo burst binary decoder for decoding to produce the desired servo burst data. Thus, the servo information is digitized and decoded without providing a comparator string in addition to what would otherwise be provided for the data channel application. Such an architecture is especially suited to a sector servo application. In this way, the data channel and servo demodulator effectively share a comparator string of a single flash A/D converter. Such dual utilization of data channel structure further reduces cost and complexity of the demodulation circuit.

Other features and advantages of the present invention should be apparent from the following description of the preferred embodiment, which illustrates, by way of example, the principles of the invention.

BRIEF DESCRIPTION OF THE DRAWINGS

FIG. 9 is a table of representative thermometer code input and decoder output values for the servo signal decoder illustrated in FIG. 4.

DESCRIPTION OF THE PREFERRED EMBODIMENT

Figure 1:
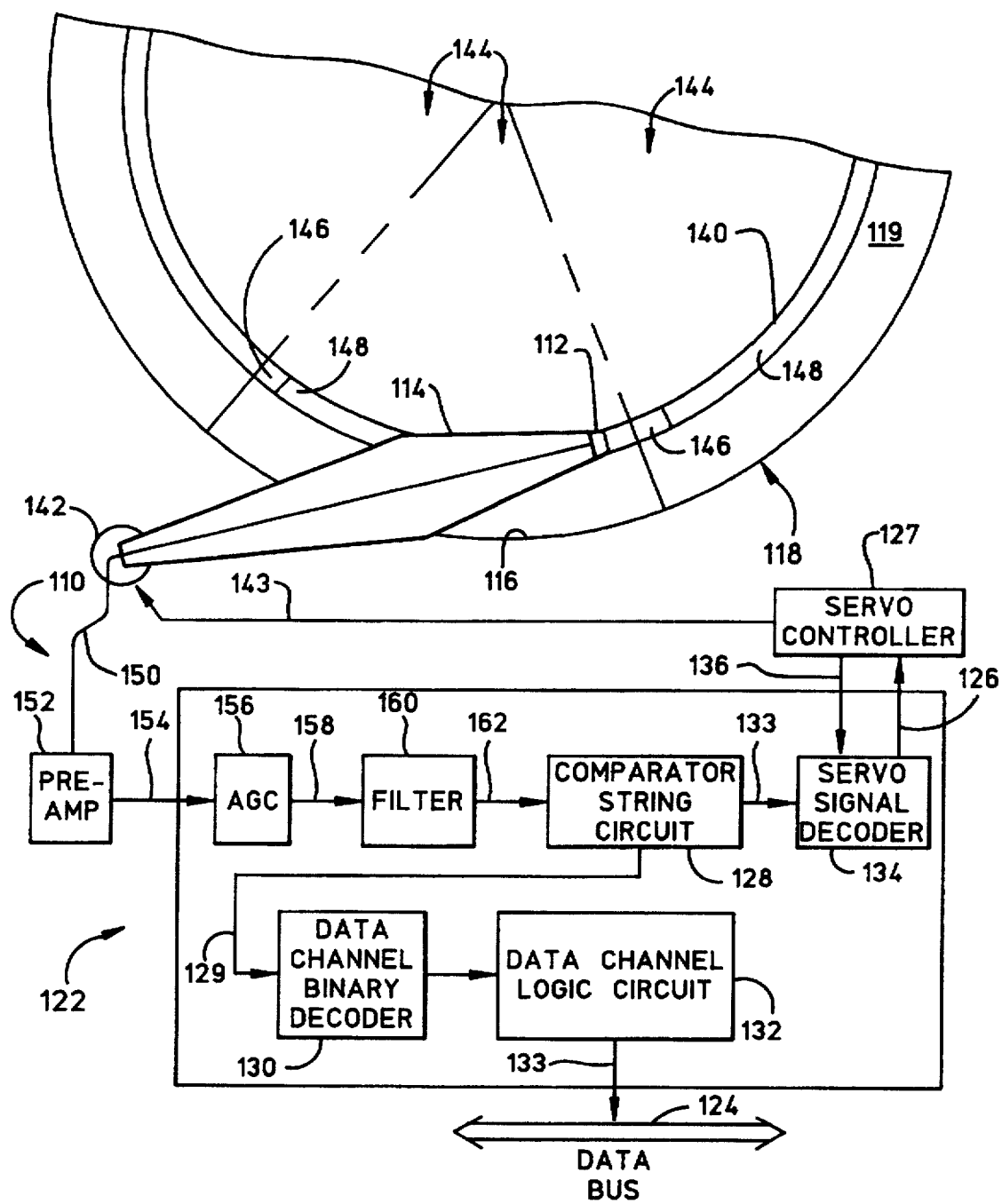
FIG. 1 is a schematic representation and block diagram of a disk drive storage system constructed in accordance with the present invention.

FIG. 1 illustrates a data storage disk drive 100 having a sector servo position control system 110 constructed in accordance with the present invention. The disk drive system of FIG. 1 includes a magnetic read/write head 112 mounted on a disk arm 114 that is suspended adjacent the top surface 116 of a storage medium comprising a disk 118 on which is deposited a magnetic recording material 119. In accordance with the sector servo system architecture, the magnetic head 112 is used to read and record data on the disk 118 and also to read a servo pattern recorded on the disk. The readback signal generated by the head 112 is provided to a channel circuit 122 that detects the readback signal and provides data values to a data channel bus 124 for data processing and also demodulates and digitizes the servo signal and sends it out on a demodulator servo signal output line 126 for position control of the head 112. A servo controller 127 receives the demodulated servo signal and controls the head movement.

To provide the desired data transmission rate for the data channel, the channel circuit 122 includes a comparator string circuit 128 that is connected by an output line 129 to a data channel binary decoder circuit 130. The comparator string circuit 128 and data channel decoder 130 together comprise what is commonly referred to as a data channel flash analog-to-digital (A/D) converter. The output of the A/D converter is provided to a data channel logic circuit 132, whose output in turn is provided over output lines 133 to the data channel bus 124. In accordance with the present invention, the output from the comparator circuit 128 also is provided over output lines 133 to a servo signal decoder circuit 134 that receives the servo burst portion of the readback signal sent through the comparator circuit and generates a digitized servo burst signal provided to the demodulator servo signal output line 126. The comparator string circuit 128 and servo signal decoder circuit 134 together perform a demodulation and digitizing operation.

The high-speed operation of the comparator string circuit 128 permits the demodulation operation to process multiple signal samples for each servo burst, thereby reducing the amount of noise in the servo signal. For example, signal samples from a servo burst can be averaged. Further gain processing, described below, permits additional reduction in servo signal noise. Moreover, the time needed for processing the servo signal is sufficiently reduced such that power consumption of the channel circuit 122 for demodulation operation during track following is reduced. Operation of the servo signal decoder 134, and therefore its power consumption, is controlled in part by the servo controller 127 via control lines 136.

The servo pattern read by the magnetic head 112 is recorded in tracks across the disk 118. In FIG. 1, a pair of circular, parallel lines designates a single servo track 140 of the disk. Only one servo track is shown in FIG. 1 for clarity and simplicity of illustration. As noted above, a single servo track can include several repeated cycles of a servo pattern and can encompass multiple tracks of data. A servo assembly 142 receives control signals from the servo controller 127 over a control line 143 and in response moves the disk arm 114 over the surface of the disk 118. It should be understood that the preferred embodiment is described with reference to the sector servo system illustrated in FIG. 1 but that the teachings of the present invention apply equally well to dedicated servo systems and other storage systems using servo-controlled heads, such as capacitive and magneto-optical disk storage systems.

FIG. 1 diagrammatically shows that the track 140 is divided into sectors 144, each of which includes a servo information field 146 followed by a data field 148. The control system 110 controls movement of the disk arm 114 over the disk 118 to move the magnetic head 112 from track to track and to maintain the head centered over a desired track. As the disk is rotated relative to the magnetic head, the head transduces the information recorded in the tracks. Thus, the magnetic head reads track servo information recorded on the disk surface at the time of disk manufacture by detecting changes in magnetic flux and generating appropriate signals. The track servo information read by the magnetic head includes track address data and an analog servo position signal generated in response to the detected flux changes.

The analog readback signal generated by the read/write head 112 when it reads the track 140 comprises data channel information when the head is over a data field 148 and comprises servo burst information when it is over a servo field 146. In either case, the readback signal is provided over a head output line 150 to a pre-amplifier 152. The pre-amplifier amplifies the readback signal and provides the amplified signal over a pre-amplifier output line 154 to the channel circuit 122. In the channel circuit, the readback signal is received by an automatic gain control (AGC) circuit 156 that adjusts the gain applied to the signal to maintain the signal amplitude within a range that is predetermined to simplify information processing, reduce noise, and improve system linearity. The amplified signal from the AGC circuit 156 is provided over an AGC output line 158 to a filter 160.

The filter 160 preferably is implemented as an analog low-pass filter. The filtered readback signal is provided from the filter 160 to the comparator circuit 128 over a filter output line 162. The data channel portion of the readback signal received by the comparator circuit is processed by the data channel decoder circuit 130 and the servo burst portion of the readback signal is processed by the servo burst decoder circuit 134, both of which perform binary conversion described further below. The channel circuit 122 can be fabricated onto what is frequently referred to as a partial response maximum likelihood (PRML) chip, so-called due to the processing implemented by the data channel circuit design.

Figure 2:
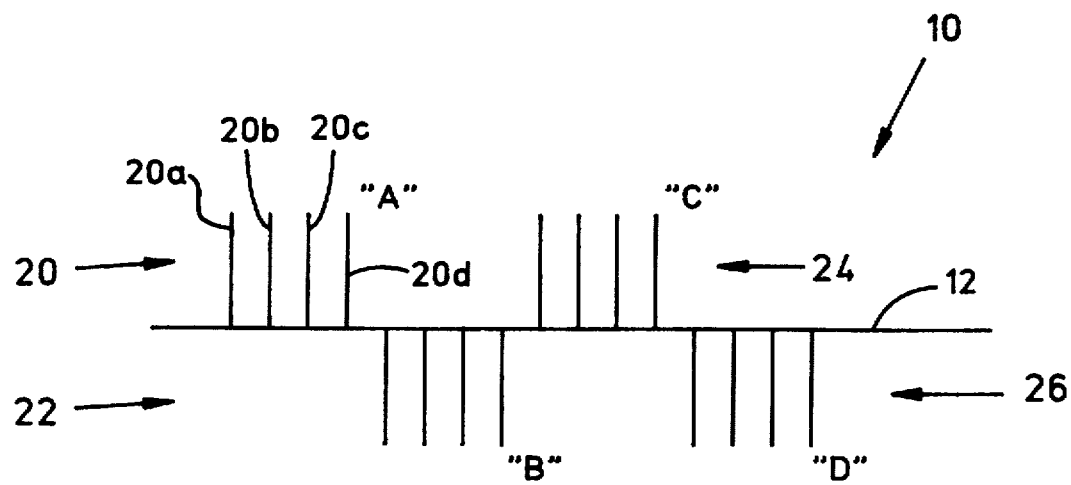
FIG. 2 is a representation of the servo burst pattern recorded in a data track of the storage disk illustrated in FIG. 1.

FIG. 2 shows a servo pattern 10 like those recorded in tracks across the disk 118 as illustrated in FIG. 1. Only one track is illustrated in FIG. 2 for simplicity. The centerline of the track is indicated by a horizontal line 12, which also generally indicates the desired path of a servo head transducing the servo pattern. The exemplary servo pattern is comprised of bursts of sequential flux transitions, represented as vertical stripes, that are recorded at a predetermined spacing and are arranged in four-stripe groups designated "A" 20, "B" 22, "C" 24, and "D" 26. Additional groups designated "E" and "F" can be used but are not illustrated for simplicity and ease of understanding. In the illustrated embodiment, each flux transition extends across one-half of the width of a track, on one side of the track centerline 12 or the other.

The FIG. 2 pattern 10 is for purposes of illustration only. It should be understood that other arrangements and groupings of transitions are possible. For example, the transitions might be arranged across multiple tracks in a repeating pattern including the A, B, C, and D transitions. Additional transition groups designated "E", "F", and the like, can be provided. Another alternative is to simply designate an "A" group for both the "A" and "C" groups and designate a "B" group for the "B" and "D" groups. Also, transitions from one track can be paired with transitions aligned in adjacent tracks. Other arrangements of servo pattern transitions should readily occur to those skilled in the art without farther explanation.

Figure 3:
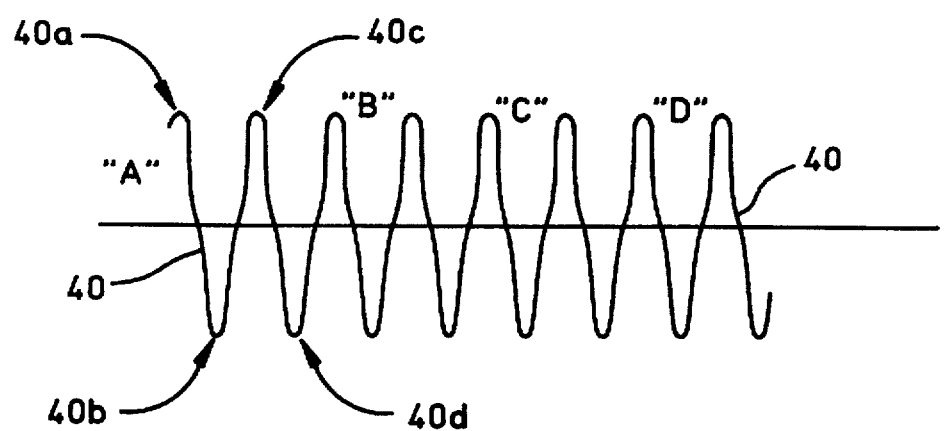
FIG. 3 is a representation of the servo burst signal produced by the read head illustrated in FIG. 1 when transducing the servo burst pattern illustrated in FIG. 2.

FIG. 3 is a representation of a readback signal 40 produced by the magnetic head 112 as it follows the track centerline 12 and transduces the servo pattern 10 illustrated in FIG. 2. Each peak of the readback signal corresponds to a vertical stripe, or transition, of the servo pattern 10. Thus, a first (positive) peak 40a of the readback signal is generated by the first stripe 20a of the first "A" servo pattern burst illustrated in FIG. 2 and a second (negative) peak 40b of the readback signal is generated by the second stripe 20b. Altogether, the four stripes 20a, 20b, 20c, 20d of the first "A" servo burst are responsible for two complete cycles of the sinusoidal readback signal 40. Dashed lines connect the stripes of the first "A" burst illustrated in FIG. 2 with their respective readback signal peaks illustrated in FIG. 3 for easier understanding of this explanation.

The "A" portion of the readback signal 40 is followed by two complete cycles of a "B" portion of the readback signal generated by the magnetic head 112 after transducing the "B" servo pattern burst. Because the illustrated servo pattern 10 (FIG. 2) follows the four "B" stripes with four "C" servo burst stripes, the first "B" portion of the readback signal 40 is followed by a "C" portion. Processing of the burst signals will hereafter be described with respect to the "A" and "B" signals but will be understood to apply equally to the "C" and "D" signals. Those skilled in the art will understand that the PES from the demodulator is generated by processing the burst values of the readback signal. For example, the PES can be generated by subtracting the peak-to-peak magnitude of the "B" signal portion from the peak-to-peak magnitude of the "A" signal portion (and subtracting the "D" from the "C"), as described further below.

Figure 4:
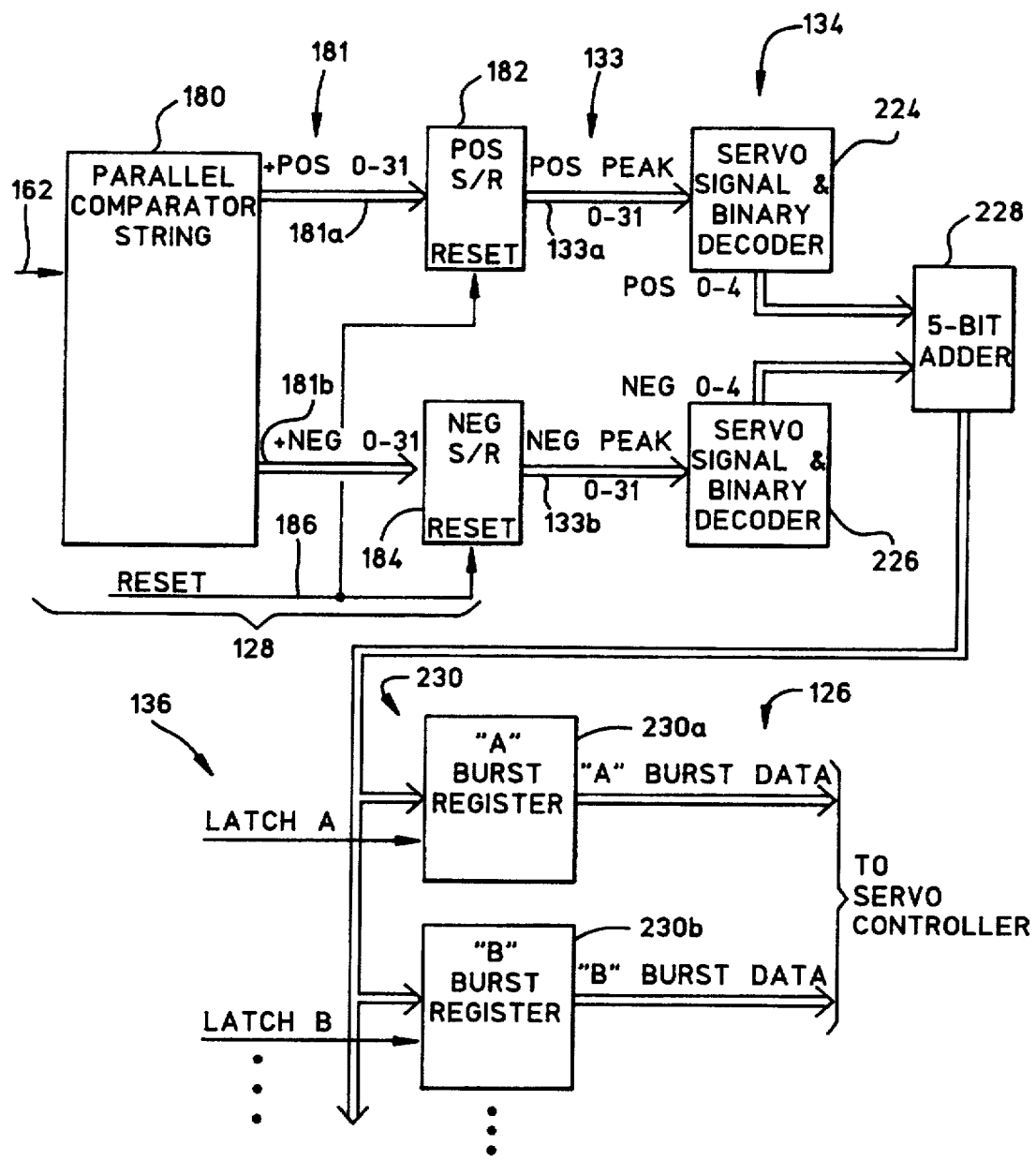
FIG. 4 is a block diagram of the comparator string circuit and servo signal decoder circuit illustrated in FIG. 1.

FIG. 4 shows details of the comparator circuit 128 and the servo signal decoder circuit 134. FIG. 4 shows that the comparator circuit includes a comparator string 180 that generates two sets of 32-bit output values 181, one set identified as a group 181a of parallel one-bit signals +POS 0, +POS 1, and so forth through +POS 31 and another set identified as a group 181b of parallel one-bit signals +NEG 0, +NEG 1, and so forth through +NEG 31. These two groups of output signals correspond to positive and negative differential readback signals, as described further below. The positive and negative differential signals are provided to positive and negative S/R flip-flop circuits 182 and 184, respectively.

The flip-flop circuits 182, 184 capture and hold the differential readback signal levels from the comparator string 180. The output of the S/R flip-flop circuits comprises the output of the comparator circuit 128, which is delivered to the comparator output lines 133. FIG. 4 shows that the output lines include respective positive and negative peak signals 133a and 133b each having thirty-two bits, which are provided to the servo signal decoder circuit 134. The flip-flop circuits receive a reset signal over a reset line 186. The reset signal can be provided by the servo controller 127 upon detecting the beginning of a servo field 146.

The output of the comparator circuit 128 comprises what is commonly referred to as a thermometer code. The thermometer code name refers to the phenomenon where the output value of all signal lines above or equal to a threshold line is logic low and the output value of all signal lines below the threshold line is logic high. The binary decoder circuit 134 converts the thermometer code of the comparator circuit to a binary code, as described further below.

Figure 5:
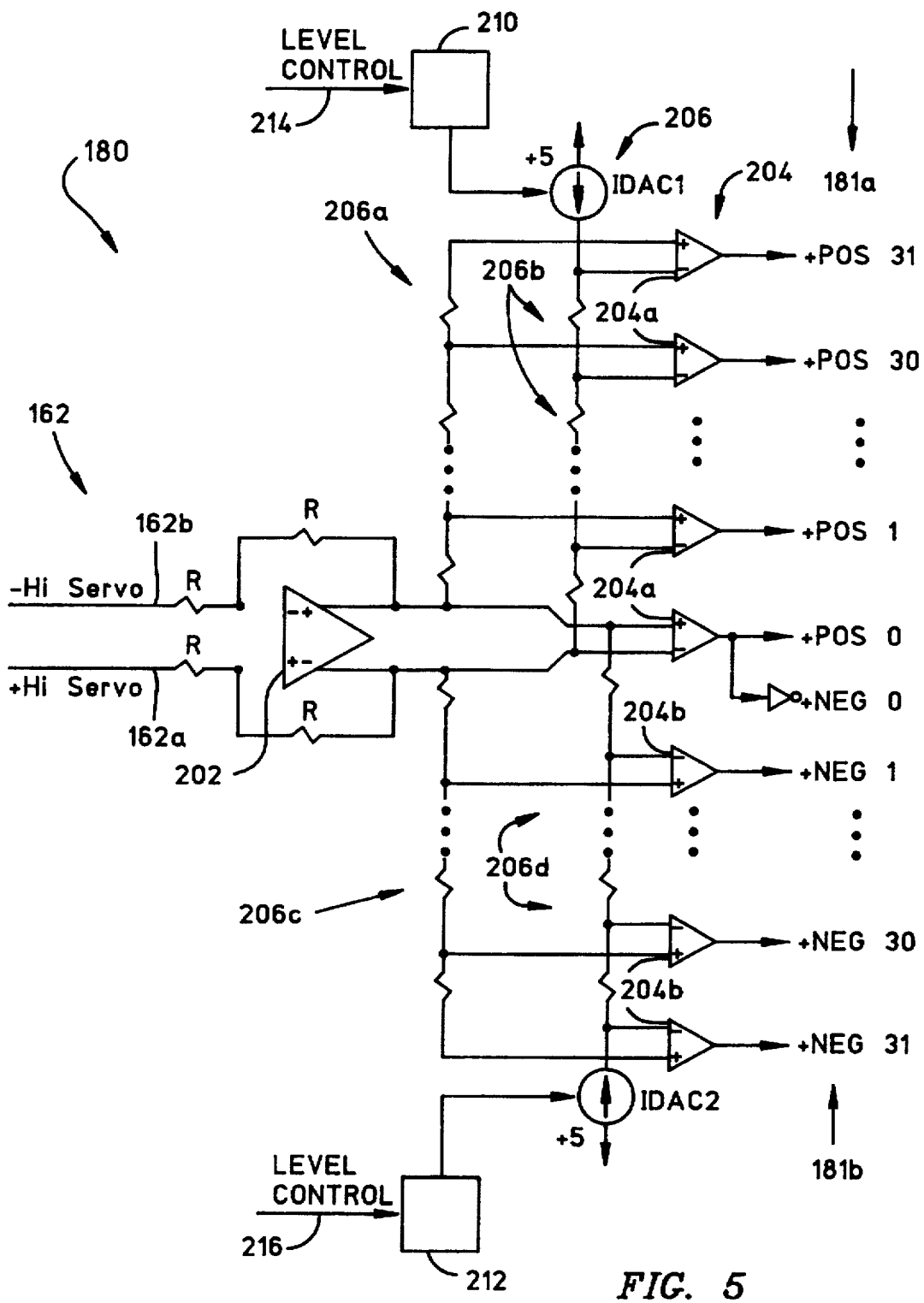
FIG. 5 is a block diagram of the parallel comparator string illustrated in FIG. 4.

FIG. 5 is a block diagram that shows construction details of the parallel comparator string 180. The output of the low-pass filter 160 is received by the comparator string over the filter line 162. FIG. 5 shows that the comparator string of the preferred embodiment is implemented with a differential inverting amplifier 202. Therefore, the filter output 162 includes a positive signal line 162a labelled "+HI Servo" that receives a positive differential component of the readback signal illustrated in FIG. 3 and includes a negative signal line 162b labelled "−HI Servo" that receives a negative differential component of the FIG. 3 signal. As known to those skilled in the art, the difference "Z" of these two signals defined by Z=+HI Servo−(−HI Servo)

is the original readback signal such as illustrated in FIG. 3. Thus, the +HI Servo signal is a signal having one-half the amplitude of the FIG. 3 readback signal 40 and the −HI Servo signal is an inverted, one-half amplitude component of the readback signal. The inverted amplifier output signals produced from these +HI Servo and −HI Servo voltages are applied simultaneously to a parallel array of comparators 204 through corresponding resistor strings 206.

The output of the comparator circuit 128 is used to determine the peak-to-peak magnitude of the respective portions (A, B, C, D) of the readback servo signal 40 illustrated in FIG. 3. It should be apparent from the block diagram of FIG. 5 that both the positive and negative differential pair voltages from the readback servo signal burst values are converted to an output range that is distributed across thirty-two comparators each. The output signals of the positive differential comparators 204a in FIG. 5 are designated +POS 31, +POS 30, . . . +POS 1, +POS 0. The output signals of the negative differential comparators 204b are designated +NEG 0, +NEG 1, . . . , +NEG 30, +NEG 31. A different number of comparators can be used to provide a scaled output range that meets the needs of a particular implementation.

The comparators 204 have equally-spaced output thresholds derived from the differential-pair voltages supplied through the resistor strings 206. For example, with reference to the comparator designated +POS 31, the positive input of the comparator is coupled to the −HI servo output of the differential inverting amplifier 202 through a resistor string 206a and the negative input of the comparator is coupled to the +HI servo output of the differential amplifier through another resistor string 206b and also is coupled to a first current source labelled "IDAC1".

The first current source IDAC1 offsets the input value to the negative terminal of the +POS 31 comparator so the only time the output of that comparator can go high is when the positive +HI servo signal exceeds the negative −HI servo signal plus the offset provided by the IDAC1 current source. In this way, the +POS 31 output is a scaled value in that it is high only when all of the preceding comparator outputs are high. This indicates the voltage level reached on a positive swing of the readback signal 40 illustrated in FIG. 3. Similarly, a scaled output value corresponding to the negative swing signal value is obtained by connection of a second current source IDAC2 to the negative input terminals of the "+NEG" comparators 204b through another resistor string 206d in combination with the connection of the inverted +HI Servo signal from the differential amplifier 202 to the positive input terminals of the comparators through another resistor string 206c.

The output of the parallel comparator string 180 is effectively scaled over thirty-two voltage bins defined by the "+POS" comparators for the positive differential signal and is scaled over thirty-two voltage bins defined by the "+NEG" comparators for the negative differential signal. The scaling of the output from the parallel comparator string 180 can be adjusted by changing the offset current provided to the resistor strings by the IDAC1 and IDAC2 current sources. As illustrated in FIG. 5, two digital-to-analog converters 210, 212 can provide control signals or current levels that adjust the output of the IDAC1 and IDAC2 sources. The converters can, in turn, be controlled by current input signals received over respective control lines 214, 216 to set the offset in accordance with the range of output values desired.

Returning to FIG. 4, the thermometer code of the respective positive and negative peak S/R flip-flop circuits 182, 184 is received by respective binary decoders 224, 226 of the servo signal decoder circuit 134. The binary decoders are conventional decoders that convert the 32-bit thermometer code of the comparator circuit 128 to a corresponding 5-bit binary code. The output from the binary decoders is provided to a 5-bit adder 228 that adds the positive and negative magnitudes to generate a digital value that represents the peak-to-peak magnitude of the readback signal for the servo signal bursts. The output of the 5-bit adder is provided to a bank of output registers 230 having a separate register for each servo burst group.

The output registers 230 illustrated in FIG. 4 include an "A" servo burst register 230a and "B" servo burst register 230b. Additional registers for the "C" and "D" bursts are included if the servo pattern includes such bursts. Likewise, additional registers are included for any other alternative servo pattern bursts such as described above in connection with FIG. 2. Respective latch signals are provided to the registers 230 over the latch control lines 136 and cause the registers to capture and hold the binary code value for the servo signal peaks. The burst data output of the registers is provided over the binary decoder circuit output line 126 to the servo controller 127 (FIG. 1), where the position error signal (PES) is derived and the appropriate control signals are generated and sent to the servo 142.

Thus, the servo signal decoder circuit 134 can be controlled by the servo controller 127 over the latch lines 136 such that the output registers 230 are latched only during the time servo data is contained in the readback signal. This reduces power consumption and ensures that the servo decoder circuit does not attempt to demodulate data channel information. The servo controller determines when to latch by detecting synchronization information recorded in the servo field 146. The latching control also can be used to implement the various readback burst signal processing described above. That is, accumulating the readback values from multiple servo bursts or determining the average value of multiple servo bursts can be implemented by controlling the latching of the demodulator registers 230. Those skilled in the art will readily understand how to implement such latching control in view of this description without further explanation.

The adder 228 and registers 230 operate such that multiple sets of comparator circuit output are received during the transducing of a single servo burst. That is, the operating speed of the comparator circuit 128 is sufficiently fast that more than one iteration of the analog-to-digital conversion process can be completed before a next servo burst pattern is transduced. This makes it possible for multiple sample values to be obtained and summed, or averaged, to reduce the affects of noise in the readback signal and improve the accuracy of the servo signal demodulation. Such multiple-sample summing and averaging can be implemented by adapting the registers to receive a predetermined number of servo signal comparator output sets per burst, adding the sets of values, and generating the sum after the predetermined number have been received. The details of such a register configuration should be readily apparent to those skilled in the art without need for further explanation.

Figure 6:
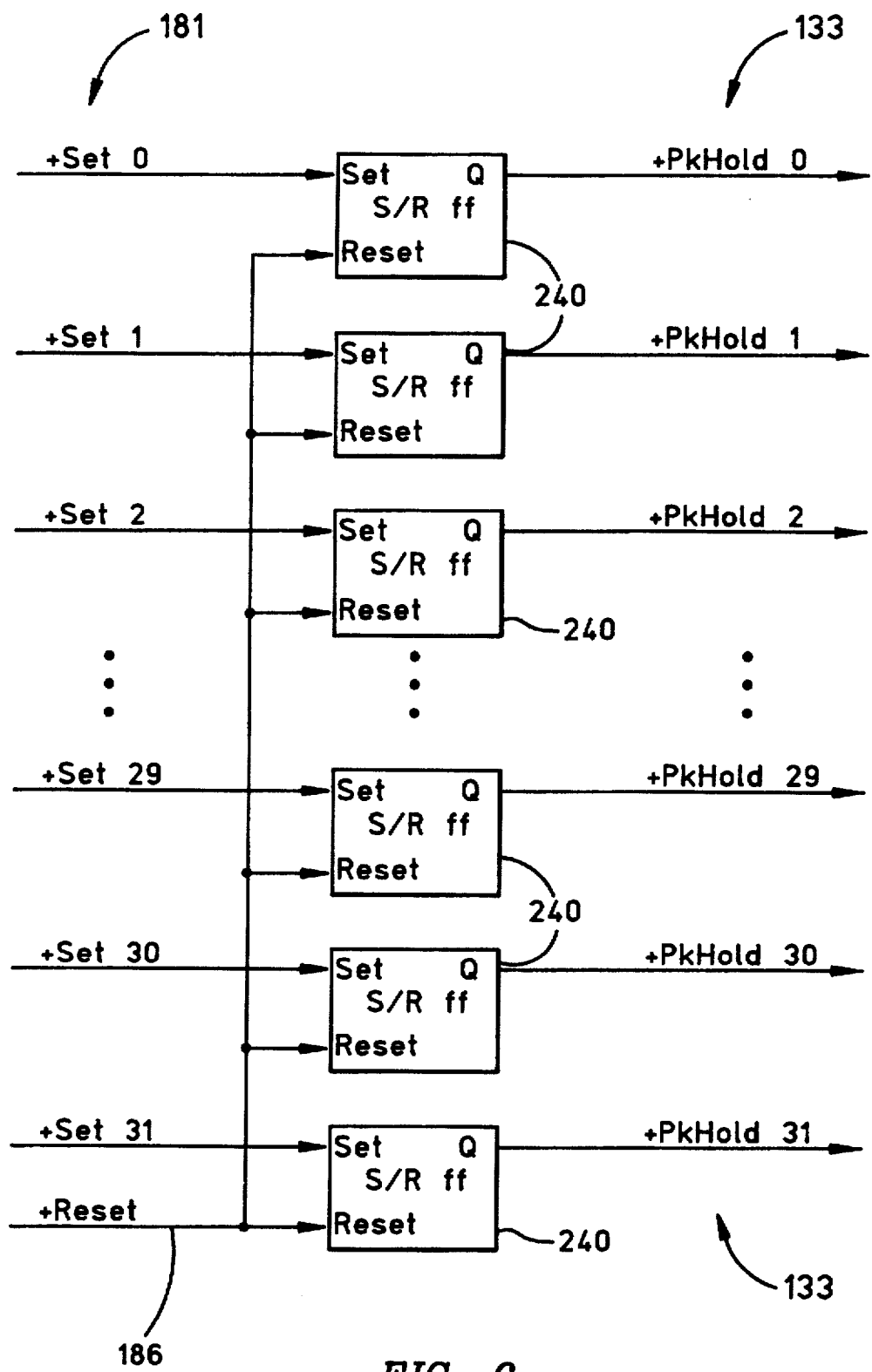
FIG. 6 is a block diagram of the flip-flop circuit of the servo signal decoder circuit illustrated in FIG. 4.

FIG. 6 illustrates the construction of the respective S/R flip-flop circuits 182, 184. It is to be understood that both of the flip-flop circuits have the construction illustrated in FIG. 6. Each flip-flop circuit includes thirty-two S/R flip-flop devices 240, each of which receives one of the thirty-two "+POS" output signals or one of the thirty-two "+NEG" output signals from the comparators 204 illustrated in FIG. 4. These comparator output signals are designated in FIG. 6 by the notation "+Set 0", "+Set 1", . . . . . "+Set 30", "+Set 31". Each flip-flop device is reset in accordance with a "+Reset" signal that goes high at the start of each servo burst signal. In this way, as the magnitude of the input burst signal increases above a comparator level, all subsequent comparators produce a high level signal. These signals set the corresponding flip-flop device, which produces a Q output signal. Each Q output signal thereby corresponds to a peak hold signal, as designated in FIG. 6.

Figure 7:
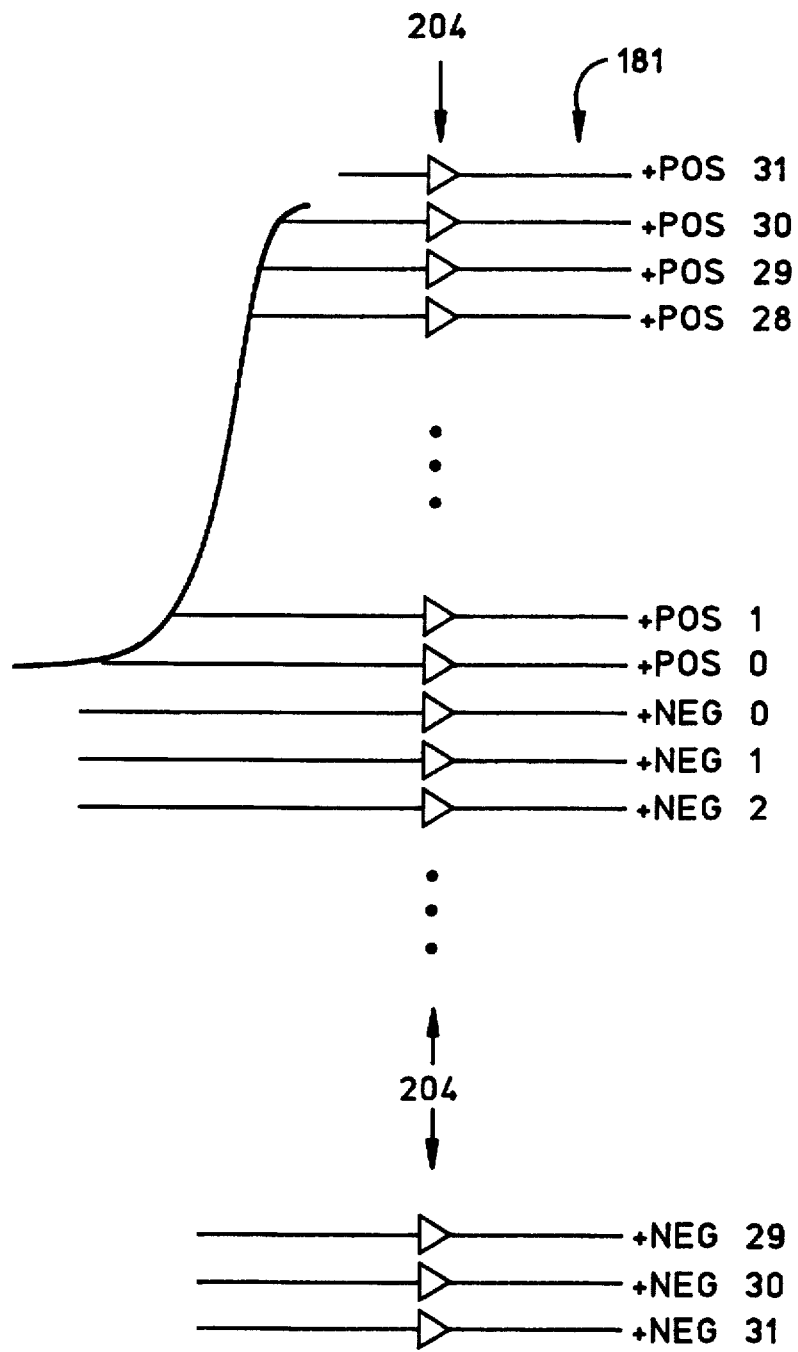
FIG. 7 is a graphical representation of the input signal and corresponding thermometer code output of the parallel comparator string illustrated in FIG. 5.
Figure 8:
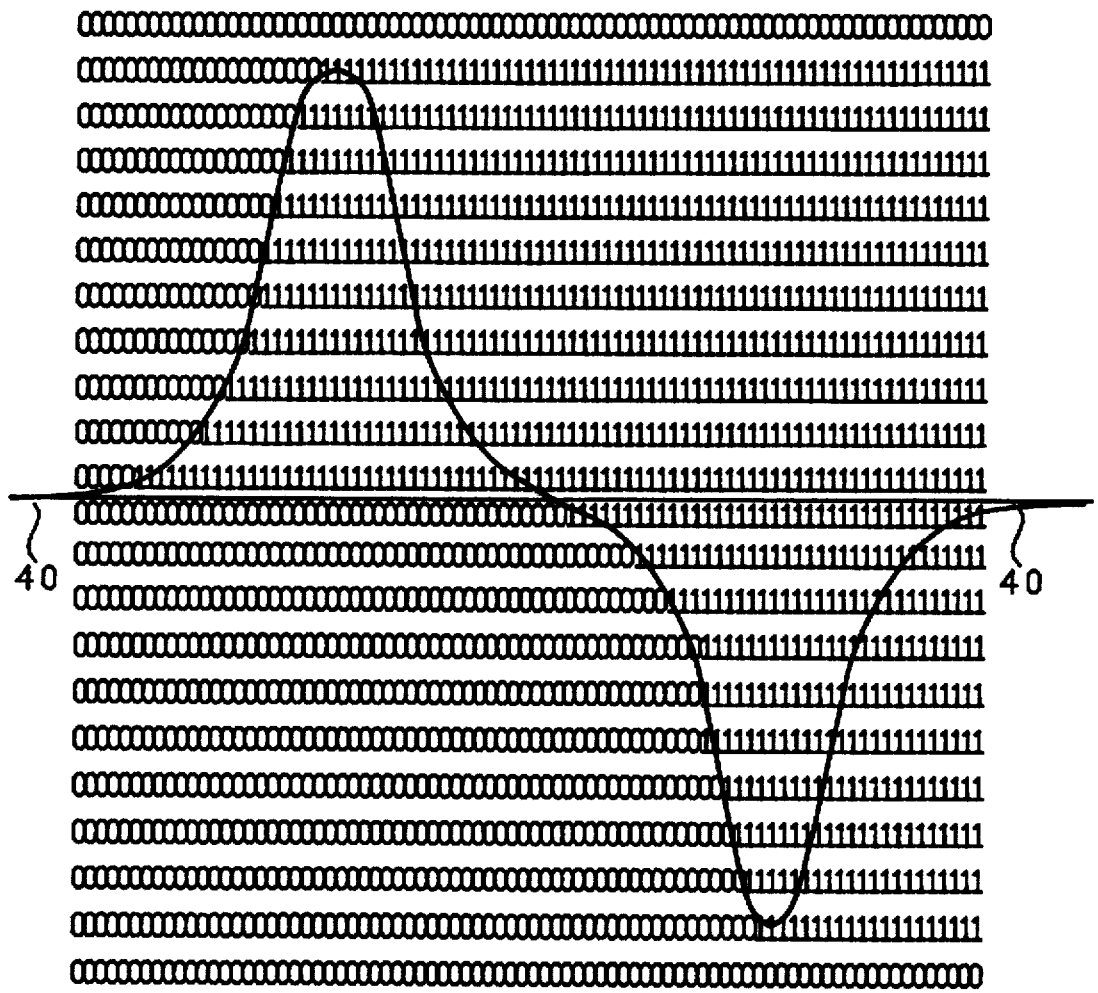
FIG. 8 is a representation of the readback signal produced by the read head illustrated in FIG. 1.

The thermometer code output is graphically illustrated in FIG. 7 and FIG. 8. In FIG. 7, a portion of the readback signal 40 is illustrated to the left of a representation of the comparators 204 of the comparator string 182. Horizontal lines extending from the readback signal to the comparators represent the changing input values to the comparators from the differential amplifier 202 of FIG. 5. FIG. 7 illustrates that, as the amplitude of the readback signal increases with time, different ones of the positive comparators 204a will have their output lines 181 go high. Similarly, as the signal decreases, different ones of the negative comparators 204b will go high. These comparators will set the output Q of their respective flip-flop devices so that once their Q output is set, their Q output will remain high.

In FIG. 8, the readback signal 40 is illustrated in juxtaposition with a representative portion of the corresponding flip-flop circuit output. That is, the readback signal is overlaid with flip-flop circuit Q output values such that a "0" indicates a logic low output and a "1" indicates a logic high output, each horizontal line representing the output of a different comparator. Not all of the output values from the thirty-two "+POS" comparators and from the thirty-two "+NEG" comparators are shown for simplicity of illustration. The successive output values are meant to represent the output frequency of the comparators in a general sense. As noted above, the comparator circuit is capable of converting input values in a cycle time on the order of nanoseconds, whereas the burst length is on the order of microseconds. FIG. 8 illustrates once again that the output of a flip-flop device remains high once set until the reset signal is received, thereby providing a peak hold function used by the decoder circuit to derive the servo burst signal peak-to-peak magnitude.

FIG. 9 is a table that shows a representative portion of the 32-bit thermometer code input from the respective thirty-two parallel comparators 204 of the +POS and +NEG range and the corresponding 5-bit binary code output of the servo signal decoder circuit 134. The comparator output values are designated X0, X1, X2, . . . . , X31 and the corresponding binary code output values are designated Y0, Y1, . . . , Y4. Comparison of FIGS. 7, 8, and 9 shows that the binary code output value changes from zero to thirty-one as the comparator output levels change. As noted above, the decoders 224, 226 are conventional. Their structure should be clear to those skilled in the art in view of this description and the table of FIG. 9 without further explanation.

Figure 10:
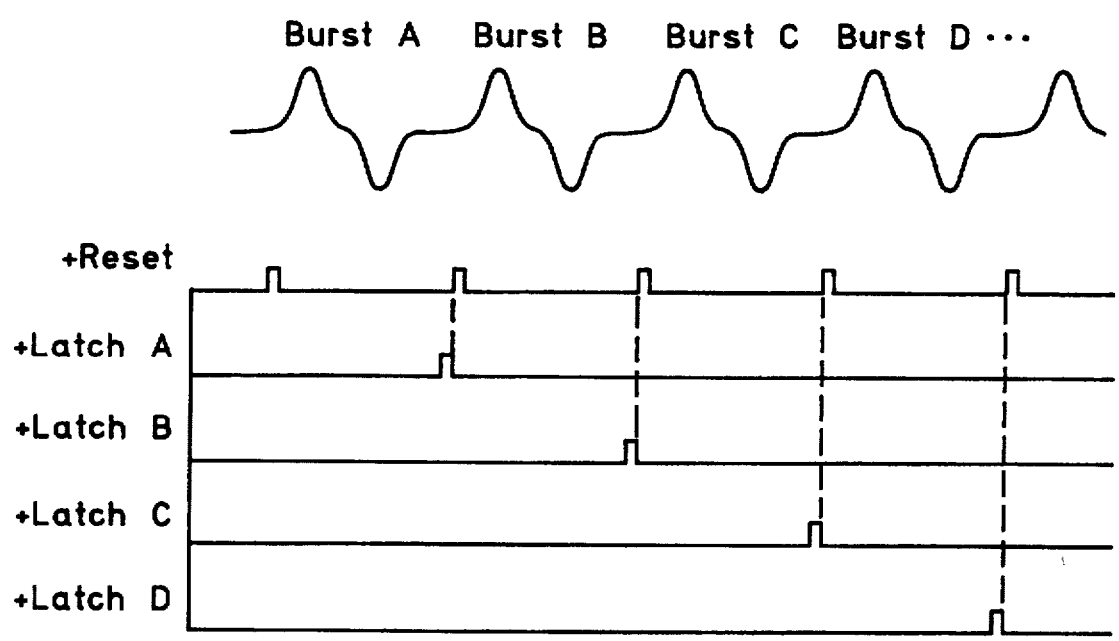
FIG. 10 is a representation of the readback signal and corresponding timing signal for the demodulator circuit illustrated in FIG. 1.

FIG. 10 illustrates the timing of the servo burst signals, the reset signal for the flip-flop devices 240, and the respective latch signals for the registers 230 illustrated in FIG. 4. At the top of FIG. 10 is a readback signal trace corresponding to the output of the read/write head 112 when it transduces the servo pattern illustrated in FIG. 2. FIG. 10 shows that the reset signal pulse occurs at the start of each cycle of the readback signal. The timing of the reset signal is derived from synchronization data that is recorded in at least one servo field 146 of the track. Thus, the reset signal comprises a pulse that goes high just before the start of a servo burst. Similarly, the latch signal pulse for a particular servo burst occurs just prior to the reset pulse for the corresponding servo burst. In this way, the registers 230 latch the appropriate date values and ignore inappropriate data values from the readback signal.

Figure 11:
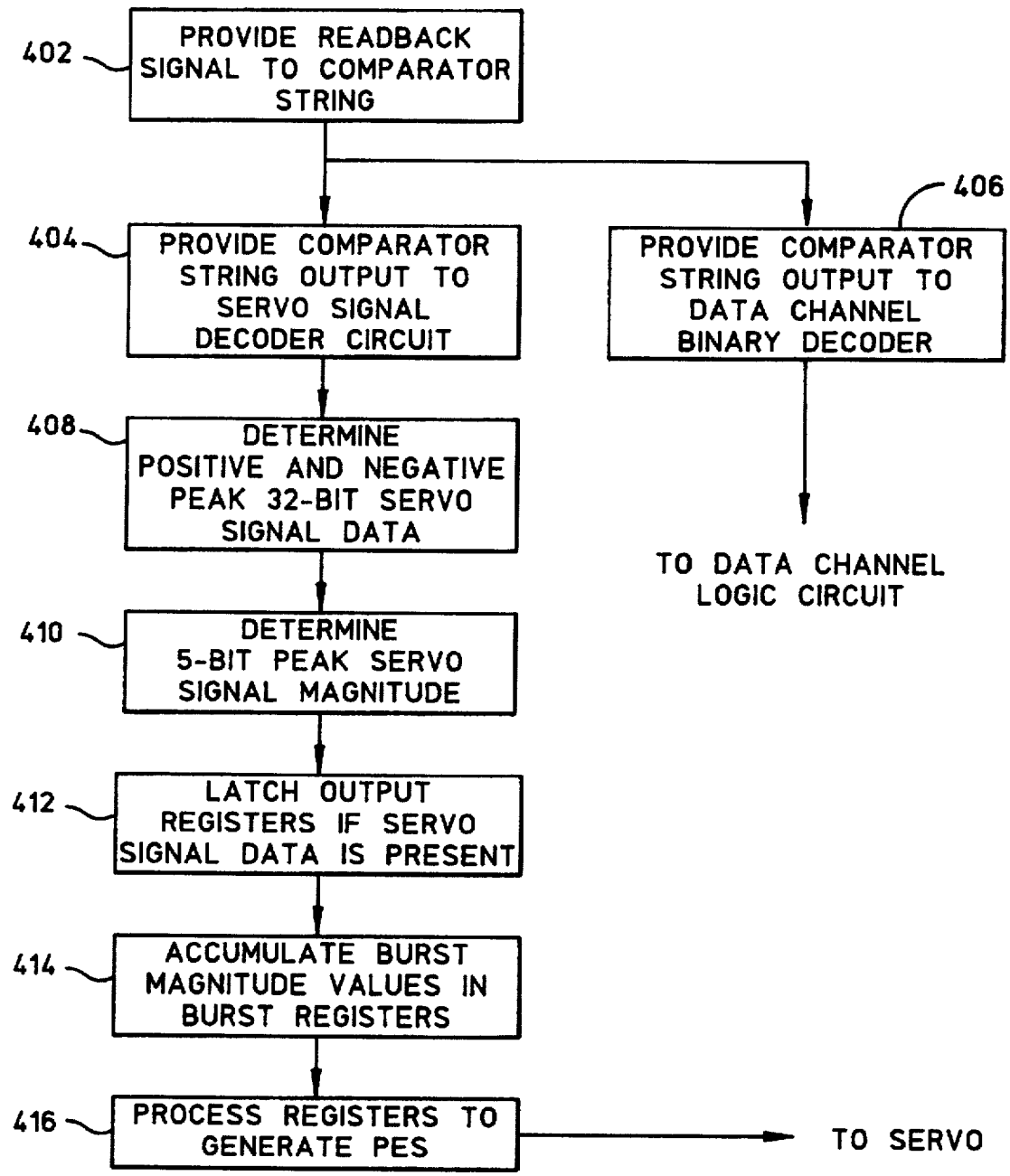
FIG. 11 is a flow diagram representing the processing steps carried out by the demodulator circuit illustrated in FIG. 1.

FIG. 11 is a flow diagram that represents the processing steps performed by the demodulator circuit of the preferred embodiment. First, at the flow diagram box numbered 402, the head readback signal is provided to the comparator string circuit of the demodulator circuit. The comparator string output is provided to both the servo signal decoder circuit at box 404 and to the data channel binary decoder circuit at box 406. The output from the data channel binary decoder is directed to the data channel logic circuit and onto the data bus.

At the flow diagram box numbered 408, the positive and negative readback signal peak values are converted to 32-bit servo signal data determined in the binary decoders of the servo decoder circuit. Next, at the box numbered 410, the 32-bit peak magnitude data is converted to 5-bit data by the adder and the peak-to-peak servo burst signal magnitude is determined. At the flow diagram box numbered 412, the adder output is latched to the decoder output registers by the servo controller if the readback signal included servo signal data. The registers otherwise are not latched, thereby conserving power. At the box numbered 414, the latched values are accumulated in the burst registers according to the scheme implemented for demodulation. That is, if multiple samples are being accumulated for demodulation, then values are accumulated in the respective burst registers for the "A" burst, "B" burst, and so forth. If averaging of readback signal samples is desired, it is at this step where the appropriate processing is carried out. Those skilled in the art will understand and be able to implement the processing that must be carried out to provide these and other schemes without further explanation. Next, at the box numbered 416, the register contents are processed to generate the PES, which is then provided to the servo for appropriate movement of the head.

Thus, a demodulation circuit as described above receives the analog disk readback signal and provides it to a comparator string, whose output is directed either to a data channel binary decoder or a servo signal binary decoder. In this way, a read channel circuit that ordinarily would include a flash analog-to-digital converter having a comparator string and data channel binary decoder can be advantageously joined with a servo signal binary decoder that uses the comparator string of the data channel A/D converter.

The present invention has been described above in terms of a presently preferred embodiment so that an understanding of the present invention can be conveyed. There are, however, many configurations for servo position control systems not specifically described herein but with which the present invention is applicable. The present invention should therefore not be seen as limited to the particular embodiment described herein, but rather, it should be understood that the present invention has wide applicability with respect to servo position control systems generally. All modifications, variations, or equivalent arrangements that are within the scope of the attached claims should therefore be considered to be within the scope of the invention.

I claim:

1. A servo signal demodulator comprising:

a comparator circuit that receives an analog readback signal transduced by a head from servo data and user data recorded in a data track recorded on a storage medium and generates a thermometer code output corresponding to the analog readback signal;

a data channel decoder that receives data channel thermometer code information from the comparator circuit at a first output rate and generates data channel information for transmission over a data bus;

a servo signal decoder that receives servo signal thermometer code information from the comparator circuit at a second output rate, demodulates it, and provides demodulated signal information to a servo controller.

2. A servo signal demodulator as defined in claim 1, wherein the data track of the storage medium includes servo data fields having a servo pattern comprising repeating magnetic transition burst pairs and the servo signal decoder produces a demodulated servo signal burst value comprising the peak-to-peak sum of a servo pattern burst pair.

3. A servo signal demodulator as defined in claim 2, wherein the servo signal decoder further comprises:

a binary decoder circuit that receives the thermometer code data value from the comparator string and produces a binary data number having a range of values representative of the scale of the thermometer code data values; and an adder circuit that generates an output burst signal comprising the peak-to-peak sum of the servo pattern burst binary data numbers.

4. A servo signal demodulator as defined in claim 3, wherein the adder circuit further includes a plurality of registers that accumulate the output burst signals from a plurality of servo pattern burst pair values for later readback and generation of a position error signal.

5. A servo signal demodulator as defined in claim 1, wherein the comparator circuit comprises:

a plurality of comparators that receive the analog readback signal and produce an output signal comprising a parallel bit differential output conversion of the positive readback signal and a parallel bit differential output conversion of the negative readback signal; and a plurality of flip-flop devices that receive the positive and negative readback signal output from the comparators and generate a positive peak thermometer code signal and a negative peak thermometer code signal.

6. A servo signal demodulator as defined in claim 5, wherein the comparator circuit further includes:

a differential amplifier that receives positive and negative components of the analog readback signal and provides a differential analog readback signal to the plurality of comparators;

a plurality of resistor strings that are connected between the differential amplifier and the comparators; and a current reference source coupled to the resistor strings such that the comparators receive a differential readback signal.

7. A servo signal demodulator as defined in claim 5, wherein the flip-flop devices comprise S/R flip-flops that are reset at the beginning of every servo burst.

8. A data storage disk drive comprising:

a magnetic storage media disk with a magnetic recording material deposited on a surface of the disk and on which is recorded at least one data track containing servo data defined by a repeating sequence of magnetic transitions comprising servo pattern bursts recorded at a servo pattern rate and containing data channel data defined by magnetic transitions comprising data values recorded at a data channel rate independent from the servo pattern rate;

a magnetic head that transduces the magnetic transitions contained in the data track and produces an analog readback signal as the disk is rotated;

a servo that moves the magnetic head relative to the surface of the magnetic storage media disk;

a comparator circuit that receives the analog readback signal and generates a thermometer code output corresponding to the analog readback signal;

a data channel logic circuit that receives data channel thermometer code information from the comparator circuit that corresponds to a transduced data channel data field of the disk and in response generates a data channel value provided to a data bus of the disk drive;

a servo demodulator circuit that receives servo signal thermometer code information from the comparator circuit that corresponds to a transduced servo pattern burst field of the disk and in response generates an output burst signal comprising the peak-to-peak sum of the servo pattern burst binary data numbers; and a servo controller that controls the servo such that the servo positions the magnetic head substantially centered over the data track.

9. A method of demodulating an analog readback signal produced by a read head as it transduces data recorded in a data track of a storage medium, wherein the data track includes both servo field data recorded at a servo pattern rate and data channel field data recorded at a data channel rate independent of the servo pattern rate, the method comprising the steps of:

providing the readback signal to a comparator string and generating a converted readback signal comprising a differential thermometer code output;

generating a peak magnitude output signal from the differential thermometer code output and providing it to a data channel decoder circuit and a servo signal decoder circuit;

converting the peak magnitude output signal to a corresponding binary value of the converted readback signal in the servo signal decoder circuit if the readback signal comprised transduced servo field data.

10. A method as defined in claim 9, wherein the step of generating a peak magnitude output signal and providing it to a data channel decoder circuit further comprises providing the output of the data channel decoder circuit to a data bus for data processing.

11. A method as defined in claim 9, wherein the step of converting the peak magnitude output signal comprises the steps of:

adding positive and negative differential peak values to generate values corresponding to the peak-to-peak readback signal value; and latching the generated peak-to-peak values in demodulator registers if the readback signal comprised transduced servo field data.

* * * * *